Dec. 23, 1930.  M. W. CONROW  1,786,229
NONSKID TIRE CHAIN WHICH IS PERMANENTLY ATTACHED TO THE WHEELS
Filed April 30, 1929   2 Sheets-Sheet 1
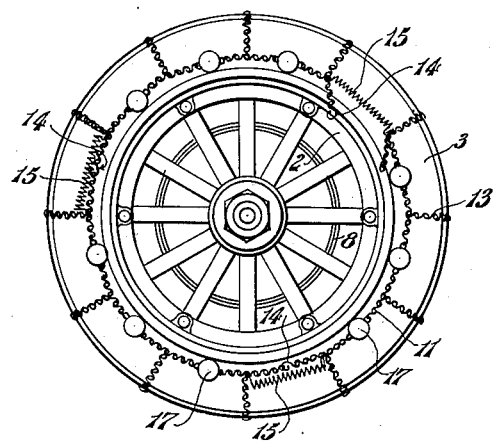
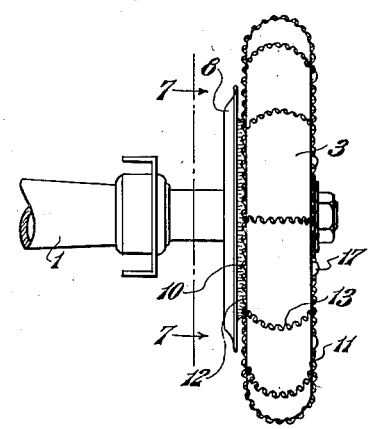
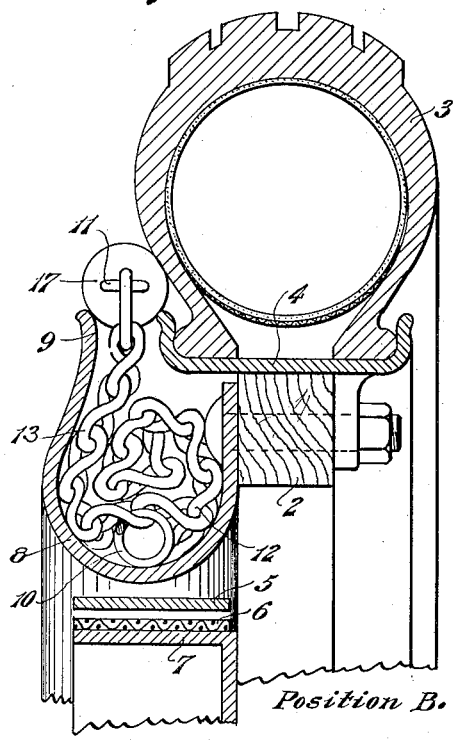
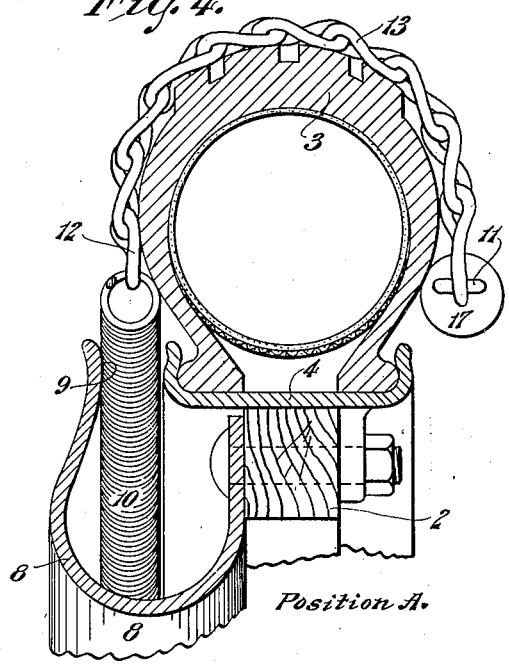
INVENTOR,
Matthias W. Conrow,
BY Harry W. Bowen.
ATTORNEY.

Dec. 23, 1930.   M. W. CONROW   1,786,229
NONSKID TIRE CHAIN WHICH IS PERMANENTLY ATTACHED TO THE WHEELS
Filed April 30, 1929   2 Sheets-Sheet 2
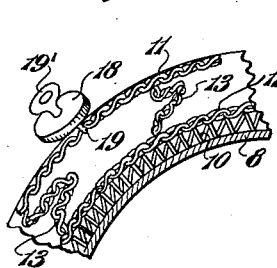
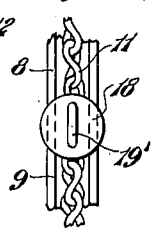
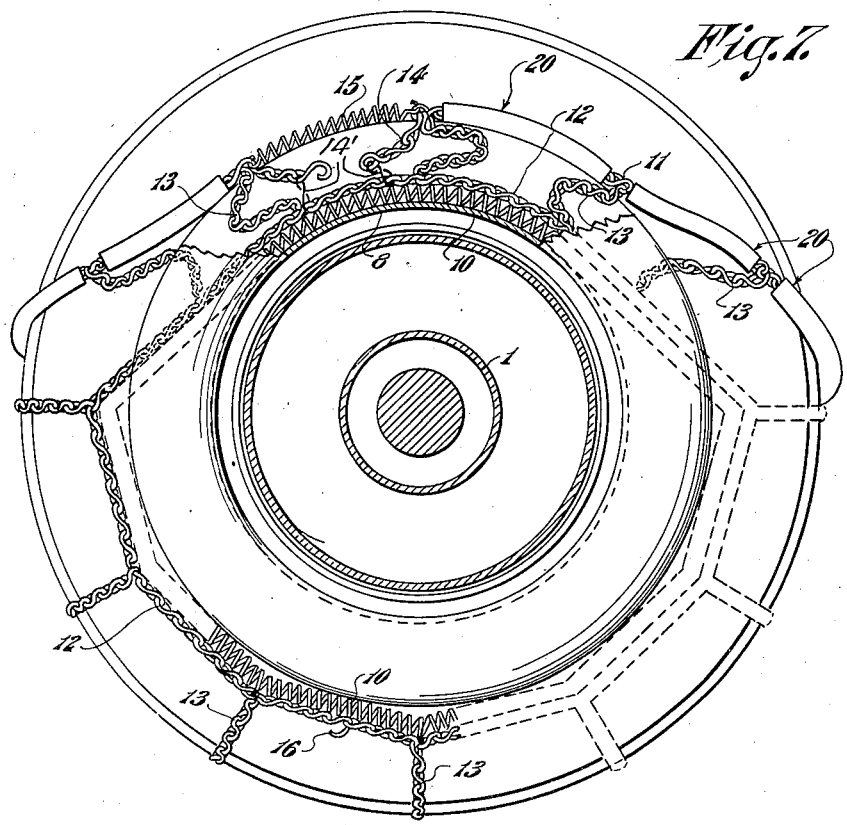
Inventor,
Matthias W. Conrow,
By
Harry W. Bowen.
Attorney.

Patented Dec. 23, 1930

1,786,229

UNITED STATES PATENT OFFICE

MATTHIAS W. CONROW, OF SPRINGFIELD, MASSACHUSETTS

NONSKID TIRE CHAIN WHICH IS PERMANENTLY ATTACHED TO THE WHEELS

Application filed April 30, 1929. Serial No. 359,228.

This invention relates to devices for supporting and carrying an automobile tire chain on a wheel of the vehicle. It relates to modifications of non-skid chains and provisions of housing for the same to make them a permanent attachment to a wheel.

The objects of the invention are to provide (a) a permanent receptacle or housing which is secured to the inside surface of a wheel, (b) contractile devices or means to retract the non-skid chain into this housing (when not in operating position) and (c) stop devices or means to prevent the outer side chain from assuming a position out of reach in the housing which stop devices are designed to be readily grasped in order to operate the invention, thereby rapidly applying the chain to the tread as hereinafter described. Two main positions are defined as "position A" and "position B". Position A is the working or operative position when the non-skid chain is applied to the tread of the tire, securely but free to creep as is the accepted mode.

Position B is the resting or inoperative position when the non-skid chain is stored in the housing on the inner side of a wheel.

Broadly considered, my invention comprises a member that is secured to the inside of a wheel of a motor vehicle which is so constructed that a tire chain may be retained therein, when its use is not required, yet will permit it to be readily withdrawn from its retaining member and secured in place on the tread of the tire, as will be fully described later.

In general, it comprises an annular channel shaped member that is secured to the inner side of the felloe or similar available space of a motor vehicle wheel. It is formed with an opening at its outer perimeter to permit the entrance and removal of the tire chain. Means are attached to the chain to permit the operator to readily grasp and remove the chain. Suitable spring means is provided for retaining the tire chain in the annular channel shaped member when not in use.

The present invention is particularly useful in inclement weather to enable the operator to readily apply the chains without even jacking up the car and to readily remove the same when chains are not needed. The chain is applied to the tire by reaching over the tread of the wheel and then pulling the chain out of its retaining annular receptacle and securing the ends of the outer side chain together.

Referring to the drawings:

Fig. 1 is an outside elevational view showing the non-skid chain in place;

Fig. 2 is an edge elevational view of Fig. 1;

Fig. 3 is an enlarged vertical sectional view showing the annular chain retaining member with the chain therein, and the tire and rim in section (see "position B");

Fig. 4 is a view similar to Fig. 3, with the chain withdrawn and applied to the tire, (see "position A");

Fig. 5 is a detail view of a modification to permit the chain to be grasped to be withdrawn from the annular member and for preventing its entering the annular member;

Fig. 5A is a plan view of the disk member to prevent the outer side chain from entirely entering the annular member;

Fig. 6 is a sectional view of a portion of the outer side chain provided with a wrapper or tubular member;

Fig. 7 is a view on the line 7—7 of Fig. 2 looking in the direction of the arrows, showing a portion of the chain in the annular member and a portion on the tire.

Referring to the drawings in detail: 1 designates the axle housing, 2 the felloe of a spoke wheel, 3 the tire on the metal rim 4. The brake band is indicated at 5, the brake lining at 6, and drum at 7.

Secured to the inner side of the felloe 2 is the U-shaped annular metal member 8 having a somewhat contracted throat opening 9 at its outer edge or perimeter. 10 is a contractile spring attached to the inner side chain and designed to retract into the member 8. 11 designates the outer side chain, 12 the inner side chain to which side chains the usual cross chains or links 13 are connected.

Located at suitable points along the outer side chain 11 are one or more connecting hooks 14, three of which are shown in Fig. 1. These hooks serve to divide the outer side chain into a suitable number of sections to permit its easy application to and removal from the tire, when required. 15 are short coiled contractile springs which are attached at their extremities to the side chain at the end of the two adjacent cross chains 13, as shown. The purpose of these short springs 15 is to permit the non-skid chain, as a whole, when unhooked at 14 to be stretched or extended a sufficient distance, (when it is applied to and removed from the tread of the tire) to pass over the tread. In other words, when the chain, as a whole, is to be stored in the annular member 8, or withdrawn therefrom, the springs 15 operate to retain the outer side chain together when unhooked, i. e., to maintain the integrity of the outer chain when unhooked at 14.

The inner side chain 12 is provided with a single hook 16 to permanently connect the ends of this side chain together.

Located on the outer side chain 11 are a series of spherical members 17 for supporting this chain in the throat 9, see Fig. 3. These balls enable the operator to grasp the same for withdrawing the non-skid chain from the annular member 8, when its use is required.

As a modification, instead of balls 17, 1 may prefer to use the disk shaped members 18, see Figs. 5 and 5A. This disk is secured to the outer side chain 11 by any suitable means, as the band 19. A tab or finger piece 19' is secured to the disk 18. This disk, it will be seen, lies at right angles to the radius of the wheel or tangent to the outer side chain. Its diameter is greater than the throat 9 in order to retain the outer side chain 11 in the same position, as does the ball 17 in Fig. 3, namely, in the throat 9 of the annular member 8.

As a further modification, I may enclose the sections or short lengths of the outer side chain 11 between the cross chains 13, within a tubular member 20 of any suitable fabric, or possibly within a short piece of hose or other tubular material. This side chain enclosing member 20 is of such diameter that it will not pass through the throat opening 9.

Referring now to the operation of my improvement, first, consider the non-skid chain as being out of use and housed within the annular member 8 (see Fig. 3) and with the disk 18, (see Fig. 5A) or modification thereof resting on the outer edge of the throat opening 9. The operator grasps one or more of the tabs 19' of this disk and draws the chain 11 over the upper outer edge of the tire 3 against the tensions of the coiled springs 10 and 15. After as much of the chain as can be pulled over has been applied, the wheel is then moved into the position shown in Fig. 7 with the applied portion of the chain at the bottom or on the ground. Next the remaining portion of the chain, shown, at the top of Fig. 7 is pulled over. The chain, as finally applied is shown in Fig. 1 but with the three hooks 14 connected.

In order to remove the tire chain from position A and store it in the annular member 8 (position B) the operator first disconnects all of the hooks 14. This allows the short contractile springs 15 to function as elastic substitutes for the corresponding sections of the outer side chain. The outer side chain is now grasped near the top with one or both hands, and by stretching the springs 15, is pushed carefully over the top of the tread and allowed to slip down the inside of the wheel. As much of the chain as possible is edged over before shifting the car. While the chain is being pushed over the contractile spring 10 begins to operate to pull, first the inner side chain and then the cross chain and the outer side chain toward the bottom of the channel, the outer side chain being prevented by its construction and the narrowed throat of the channel from entering (see Fig. 3). Suitable means is provided for holding the loose ends of the chains 14 when not in use as indicated by the hooks 14'.

The several advantages of my invention are: ease of application and removal and this avoids or prevents over wear of chains and treads as the chains will be removed sooner. It can be applied when the wheel is in a hole and even under water, at least enough to get the car and wheel out. It does not prevent the use of any other non-skid chain.

I wish it to be understood that I do not limit myself to any particular construction of housing or supporting device for the tire chain or to any particular type of chain which may be used and permanently attached to the wheel.

What I claim is:

1. In combination, a device for the purpose described comprising an annular member having a throat opening; means for attaching the annular member to the inner side of a vehicle wheel, a non-skid tire chain designed for housing in the annular member, the outer side chain being divided into a plurality of sections, means for connecting the sections together when the said chain is in use, the inner side chain having a means for connecting the ends of this chain together, a coiled contractile spring located in the housing and attached to the inner side chain for automatically drawing the non-skid chain, as a whole, into the annular member, and means for preventing the entire length of the outer side chain from entering the housing.

2. In a device for the purpose described, a non-skid chain having side and cross chains, a member secured to the inner side of a wheel for housing the chain, when not in use, the outer side chain of said non-skid chain being divided into a plurality of sections, means for securely connecting the sections together, when in use, springs having their extremities connected to the outer side chains where the cross chains are connected to the outer side chains, the springs serving to maintain the continuity of the outer side chains, when the section connecting means are disconnected, and spring means in the housing connected to the non-skid chain for automatically drawing the chain as a whole into the same, as described.

3. In a device for the purpose described, a non-skid chain having side and cross chains, a member secured to the inner side of the wheel for housing the chain, when not in use, the outer side chain being divided into a plurality of sections, hook means for connecting the sections together, when in use, springs having their extremities connected to the outer side chains at the points where some of the cross chains are connected to the outer side chains, the springs serving to maintain the continuity of the outer side chains, when the section connecting means are disconnected, spring means in the housing and connected to the non-skid chain for automatically drawing the chain into the same, as described, and means for holding a portion of the outer side chain from entering the housing, whereby it may be removed from the housing for use.

4. In combination, a device for the purpose described comprising an annular member formed with a throat opening, and secured to the inner side of a wheel for housing a non-skid tire chain comprising side and cross chains, spring means in the housing and permanently connected to the inner side chain for retaining the chain therein, means to hold a length of the outer side chain projecting from the housing and for providing for the easy removal of the chain as a whole from the housing member, the non-skid chain having its outer side member divided into a plurality of sections, means for connecting the sections together, when in use, and spring means attached to the outer side chains for connecting the sections together, when the connecting means of the sections are disconnected, whereby the outer side may be extended for moving the same over the tread of the tire and whereby the spring means in the housing can automatically draw the entire non-skid chain into the housing.

5. In a device for the purpose described, a non-skid chain having side and cross members, a member secured to the inner side of a vehicle wheel for housing said non-skid tire chain, spring means in the housing and permanently connected to the inner side member for retaining a portion of the chain therein, stop means to hold a length of the outer side member from entering the housing and for providing a handle device for the easy removal of the chain, as a whole, from the housing member.

6. A device for the purpose described comprising an annular member secured to the inner surface of a vehicle wheel, a non-skid chain having side and cross members, the said member having a throat opening for the entrance of the non-skid chain, said chain having its outer side member divided into a plurality of sections, spring means in some of the sections whereby the outer side member may be extended, when the said chain is to be pushed over the tread of the tire and located in the housing, and means in the housing to retain a length of the chain therein.

7. In combination, a device for the purpose described comprising an annular chain housing member formed with a contracted annular throat opening, means for securing the housing member to a wheel, a non-skid tire chain comprising side and cross members, said members being permanently secured to the chain housing, and means for automatically housing the said chain in said member and for retaining it therein.

8. A device, for the purpose described, comprising an annular member secured to the inner surface of a vehicle wheel and formed with a throat for receiving a non-skid chain, a chain having its outer side chain divided into a plurality of sections, means in the sections whereby the continuity of the chain may be maintained and whereby the outer side chain may be temporarily extended, when the chain, as a whole, is to be pushed over the tread of a tire and located in the housing, a contractile spring in the housing which is connected to the non-skid chain to resiliently retain the chain therein, and means independent of the extension means for connecting the sections together, when the tire chain is in use.

MATTHIAS W. CONROW.